US012783662B2

(12) United States Patent
Heath et al.

(10) Patent No.: US 12,783,662 B2
(45) Date of Patent: Nov. 3, 2026

(54) DETECTION OF RANSOMWARE ATTACK AT OBJECT STORE

(71) Applicant: Seagate Technology LLC, Fremont, CA (US)

(72) Inventors: Paul Roger Heath, Severna Park, MD (US); Rupasree Roy, Fremont, CA (US)

(73) Assignee: Seagate Technology LLC, Fremont, CA (US)

( * ) Notice: Subject to any disclaimer, the term of this patent is extended or adjusted under 35 U.S.C. 154(b) by 928 days.

(21) Appl. No.: 17/855,350

(22) Filed: Jun. 30, 2022

(65) Prior Publication Data

US 2024/0005000 A1 Jan. 4, 2024

(51) Int. Cl.
*G06F 21/56* (2013.01)

(52) U.S. Cl.
CPC .......... *G06F 21/565* (2013.01); *G06F 21/566* (2013.01); *G06F 2221/034* (2013.01)

(58) Field of Classification Search
CPC . G06F 21/565; G06F 21/566; G06F 2221/034
See application file for complete search history.

(56) References Cited

U.S. PATENT DOCUMENTS 11,843,622 B1 * 12/2023 Tellez ................. H04L 63/1425
2006/0146622 A1 * 7/2006 Mukherjee ............. G11C 29/16
365/201
2019/0026466 A1 * 1/2019 Krasser ................. G06F 21/552
2019/0251279 A1 8/2019 Emberson et al.
2019/0273510 A1 * 9/2019 Elkind ................ H03M 7/4093
2019/0342311 A1 11/2019 Muddu et al.
2020/0311262 A1 * 10/2020 Nguyen ................ G06F 21/554
2020/0327225 A1 * 10/2020 Nguyen ................ G06F 40/274
2021/0044604 A1 2/2021 Annen et al.
2021/0216627 A1 7/2021 Grunwald et al.
2021/0216633 A1 7/2021 Lee et al.
2021/0303687 A1 9/2021 Pendlebury et al.
2023/0409714 A1 * 12/2023 Chen ........................ G06N 5/01
2024/0137375 A1 * 4/2024 Srivatsa ................ H04L 41/142

* cited by examiner

*Primary Examiner* — Linglan Edwards
*Assistant Examiner* — Kamryn J Gillespie
(74) *Attorney, Agent, or Firm* — Seagate Technology LLC

(57) ABSTRACT

The technology disclosed herein provides a method including receiving a plurality of input/output (IO) requests at an object store, removing one or more fields from each of the plurality of input/output (IO) requests to generate a plurality of condensed IO requests, transforming one or more fields of each of the plurality of condensed IO requests to generate transformed IO requests, combining a predetermined number of transformed IO requests to generate IO trace temporal sequences, generating machine learning (ML) model input feature vectors by assigning each of the IO trace temporal sequences a ground truth value indicating whether the IO trace temporal sequence represents a ransomware attack, and training an ML model using a plurality of the ML model input feature vectors.

20 Claims, 5 Drawing Sheets

DETECTION OF RANSOMWARE ATTACK AT OBJECT STORE

BACKGROUND

Ransomware has become a major cyber-security threat over the past few years. It is estimated to have cost enterprises upwards of $5 billion in damages annually. A significant issue in failing to detect ransomware is the prevalent use by data security vendors of signature-based approaches to malware detection. While this approach may be effective for some malware detection, it is not as reliable for ransomware detection because it is easy for a bad actor to release a new variant of ransomware with a different signature and thereby escape detection. Some newer data security products have introduced machine learning-based behavioral analysis to combat this signature modification, but these approaches can be computationally expensive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein provides a method including receiving a plurality of input/output (IO) requests at an object store, removing one or more fields from each of the plurality of input/output (IO) requests to generate a plurality of condensed IO requests, transforming one or more fields of each of the plurality of condensed IO requests to generate transformed IO requests, combining a predetermined number of transformed IO requests to generate IO trace temporal sequences, generating machine learning (ML) model input feature vectors by assigning each of the IO trace temporal sequences a ground truth value indicating whether the IO trace temporal sequence represents a ransomware attack, and training an ML model using a plurality of the ML model input feature vectors.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Figure 1:
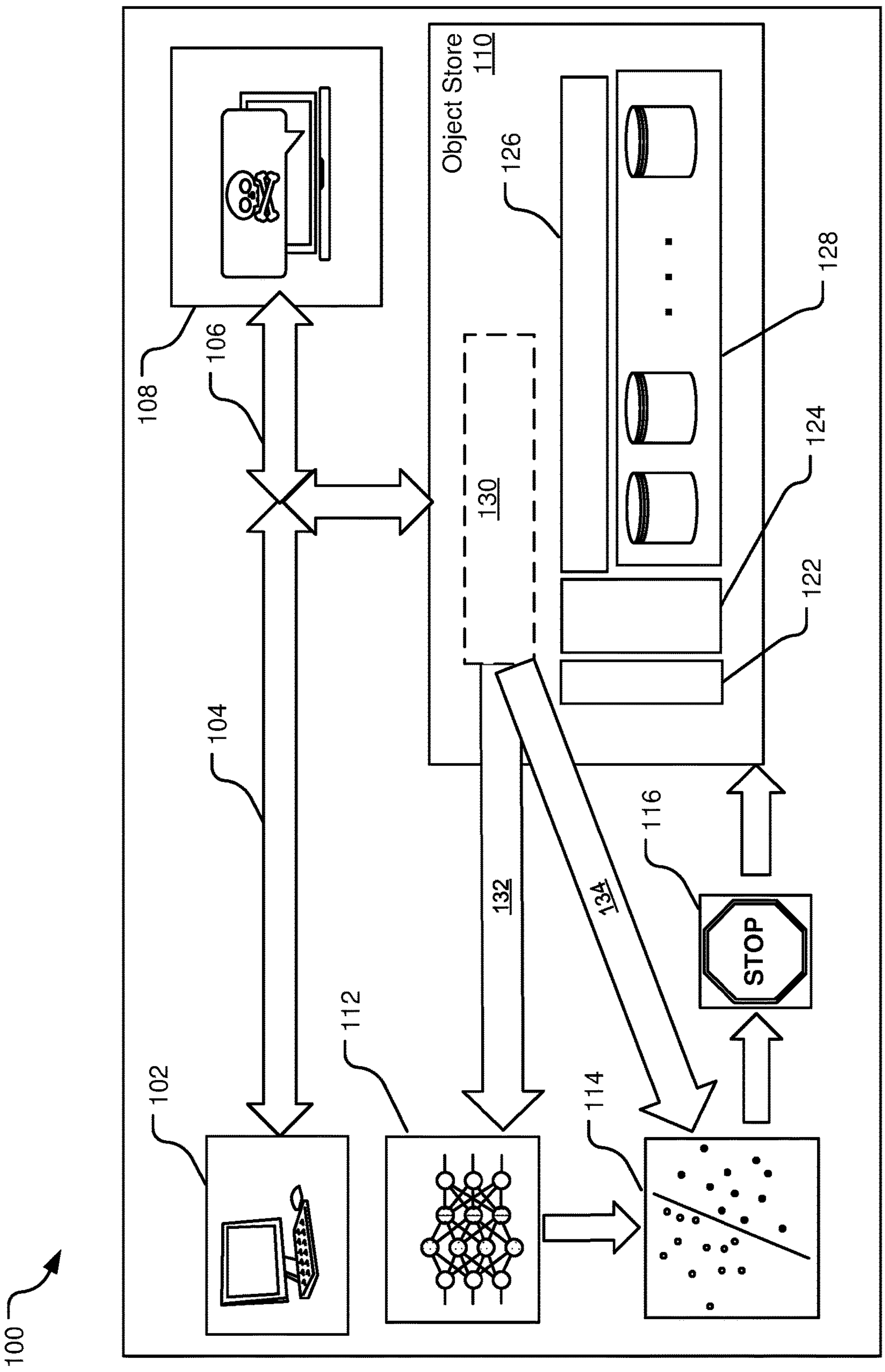
FIG. 1 illustrates an example schematic diagram of a system for detecting ransomware attacks on an object store.

Ransomware is an increasingly potent threat to modern computer systems. Like other forms of malware, a ransomware attack gains access to a computer system through one of many access vectors. Once on the machine, the ransomware executes after some trigger point. The code will enumerate items in the file system. Files that meet the requirements of the ransomware infection, typically user files rather than system files, are individually encrypted and written back to the filesystem, sometimes under a different name. At the end of the enumeration and encryption process, the ransomware may issue a notice to the user indicating; that the files have been encrypted and can be released after ransom is paid. Ransoms are normally paid in some form of crypto currency to provide a measure of anonymity to the attacker. Timely detection of such ransomware attacks is important to ensure that not a large number of files are encrypted and therefore subject to ransom.

The technology disclosed herein pertains to method for the detection of ransomware type malware attacks on an object store system. Most of the existing solutions for ransomware detection are client side solutions in that they monitor activity at a client, such as unusual operating system activity, etc. The solutions disclosed herein address monitoring activity on server side, specifically for servers configured to have an object store. Specifically, the implementations disclosed herein allows determining the ransomware attacks quickly so that the ransom ware is not able to infect a large amount of object files on the object store before its access to the server is blocked.

Specifically, the solution disclosed herein collects I/O traces from requests by clients to the object store. The client requests to an object store are specifically different in nature compared to client requests to files located on the server in that the client requests to an object store include a number of fields such as a comm field identifying a process running on the server that requests the object store to do a specific operation, a process ID (PID) field that provides identification of the process, etc. Compared to this, client requests to a database or a server merely storing a number of files do not include any information about process ID, etc. Ransomware attacks may use the capabilities of the client requests to object stores, including their ability to initiate one or more processes to gain access to the object store data. The implementations disclosed herein uses such fields specific to client requests to an object store to train a machine learning model to detect ransomware attacks on object stores.

To accomplish timely detection, the IO trace records are formatted into short temporal sequences. The short temporal sequences are further processed to remove data that is unimportant (for example, the size of the data RW request, sector number of the data RW request, etc.). Subsequently, a first amount of the processed collection of such short temporal sequences are used to train a ML model and a second amount is used to test the model. In one or more implementations disclosed herein the temporal sequences are generated based on combination of IO requests. In an alternative implementation, the processing of the sequences to remove extraneous data such as one hot coding of the byte size field, sector location field, etc. Furthermore, various implementation of the ransomware attack detection system disclosed herein may also be used in detecting malware attacks on object stores.

FIG. 1 illustrates a schematic diagram of a ransomware detection system 100 for detecting ransomware attacks on an object store. Specifically, the ransomware detection system 100 collects, stores, and analyzes access patterns to an object store 110. An example of an object store may be an AWS™ object store, a CORTX™ object store, a MinIO™ object store, etc. In one implementation, the system 100 collects samples of access patterns to the object store 110, generates temporal sequences of such access patterns, and reshapes the temporal sequence of access patterns. The object store 110 may include a number of object databases 128 storing data objects or other objects (referred to herein as data objects) that may be accessed by a data store access management module 126 such as the AWS simple storage service (S3) data store access management module, a POSIX based data store access management module, etc. The data objects stored in the object databases 128 may be managed by a management and monitoring module 124 that can be use various interfaces 122 including application programming interfaces (APIs), graphical user interfaces (GUIs), command line interfaces (CLIs), etc.

One or more clients 102 may access the object store 110 to read, update, or write data objects from the object store 110 using data access channel 104. For example, the data access channel 104 may be implemented over a communication network such as the Internet. However, one or more malicious third party 106 may also use another data access channel 106, which also may be implemented on the Internet, to send malicious commands for malware and ransomware to the object store 110. The implementations disclosed herein provides a method of detecting such malware and ransomware attack commands to the object store 110.

An input/output (IO) request processor 130 collects, stores, and analyzes access patterns to the object store 110. Specifically, the IO request processor 130 collects sequences of IO requests received at the object store 110 from the data access channel 104 and processes the sequences to generate a number of samples that may be used by a machine learning (ML) training module 112 that generates a classification model 114 that can be used to classify real time IO requests to the object store 110 to determine if such IO requests include malware or ransomware attack commands. The IO requests received at the IO request processor 130 may include a number of fields such as a time of request, a command, a PID, a disk identifier, a R/W identifier, a sector, number of bytes, latency, etc.

In one implementation, instead of processing each row of access request individually, the IO request processor 130 processes a predetermined number of rows of access requests and processes them together. For example, the IO request processor 130 may collect 64 or 128 rows of IO requests and processes them together. During a training phase, the IO request processor 130 may collect a sequence of IO requests to the object store 110 and remove one or more fields from the sequence of IO requests to generate condensed IO trace requests. For example, the IO request processor 130 may remove any row or request where the value of a sector is "0" as such requests may represent a system level command that may not be part of any ransomware attack.

Similarly, the IO request processor 130 may remove the field representing the latency of an IO request, which provides how long it may take to process a particular IO request as this field does not provide valuable information in determining whether a given IO request may or may not represent malware or ransomware attack. On the other hand, the process name and the process ID for each IO request may be included in the flat file as they provide valuable information about whether a given IO request may or may not represent malware or ransomware attack. Other fields that are used by the IO request processor 130 may include the sector field, the byte field, the field representing whether a request is a read or a write request, and the field representing the name of the disk or storage device accessed by the IO request. All of these fields may be used as input features for training an ML model.

After removing the fields that are not of interest, the IO request processor 130 combines a predetermined number of condensed IO trace requests to generate a number of IO trace temporal sequences. In an implementation 64 condensed IO trace requests are combined to generate an IO trace temporal sequence. Alternatively, 128 condensed IO trace requests may be combined to generate an IO trace temporal sequence. The number of condensed IO trace requests used to generate an IO trace temporal sequence may depend on the speed required to detect ransomware attacks. Thus, the larger the number of IO trace requests used to generate an IO trace temporal sequence, the longer it may take to determine a ransomware attack. However, using a larger number of IO trace requests used to generate an IO trace temporal sequence may also result in improved accuracy with which ransomware attacks may be determined.

Subsequently, the IO trace temporal sequences are used to generate feature vectors that may be used by the ML training module 112. Specifically, one or more fields of the IO trace requests are transformed to generate the feature vector. For example, a process ID (PID) field, which is a numeric field may be transformed to a non-numeric field that reduces the importance of the magnitude of the numeric number representing the PID. Specifically, the PID field has a numeric values, but the magnitudes of these values have no significance to what the value represents. For example, a process ID of 1058 is no more or less important to a classification than a process value of 2412. Therefore, in an implementation disclosed herein the value of the PID is changed using one hot encoding process to be a value between −1 and +1.

Similarly, the value representing the disk field may be transformed by one-hot encoding to generate a modified disk field value. Furthermore, the value of the sector field, which may be typically a series of numeric values, are scaled to be within a predetermined range. In one example, the value of the sector field is scaled so that each value falls within the range of −1 to +1. Similar scaling to a range between −1 and +1 may also be applied to the bytes field. Such scaling of the fields ensures that the sector fields is not evaluated more heavily during training an ML model compared to, for example, the bytes field. Specifically, even when the sector field is a large number and the bytes field is a smaller number, scaling both of them to a range of −1 to +1 ensures that the values of each are given equal importance during the training of the ML model. Subsequently, each IO trace temporal sequence may be assigned a ground truth value of 1 or 0 to generate ML model input feature vector, with 1 being the IO trace temporal sequence representing a ransomware attack and 0 being the IO trace temporal sequence not being a ransomware attack.

During the training phase, the ML model input feature vector generated based on the training set of IO requests are communicated 132 to the ML training module 112. The ML model input feature vectors generated by the transformation of the IO trace requests are used by the ML training module 112 to generate the classification model 114 that can be used to classify real time IO requests to the object store 110 to determine if such IO requests include malware or ransomware attack commands. The classification model 114 maybe one of a multilayer perceptron classifier (MLPC) model, a logistic regression model, a decision trees model, and a K-Nearest Neighbor model. Generating the ML model input feature vector in the manner recited herein allows achieving over ninety-two percent (92%) overall combined accuracy for the above models.

During the application of the classification model 114, the IO request processor 130 processes sequences of real time IO requests to the object store 110 and remove one or more fields from the sequence of IO requests to generate condensed IO trace requests. Subsequently, the IO request processor 130 combines a predetermined number of condensed IO trace requests to generate a number of IO trace temporal sequences and then generates feature vectors based on the IO trace temporal sequences. These feature vectors based on the real time IO requests are fed 134 to the classification model 114, which is able to classify the sequence of IO requests to the object store 110 as including ransomware or malware attack commands.

Figure 2:
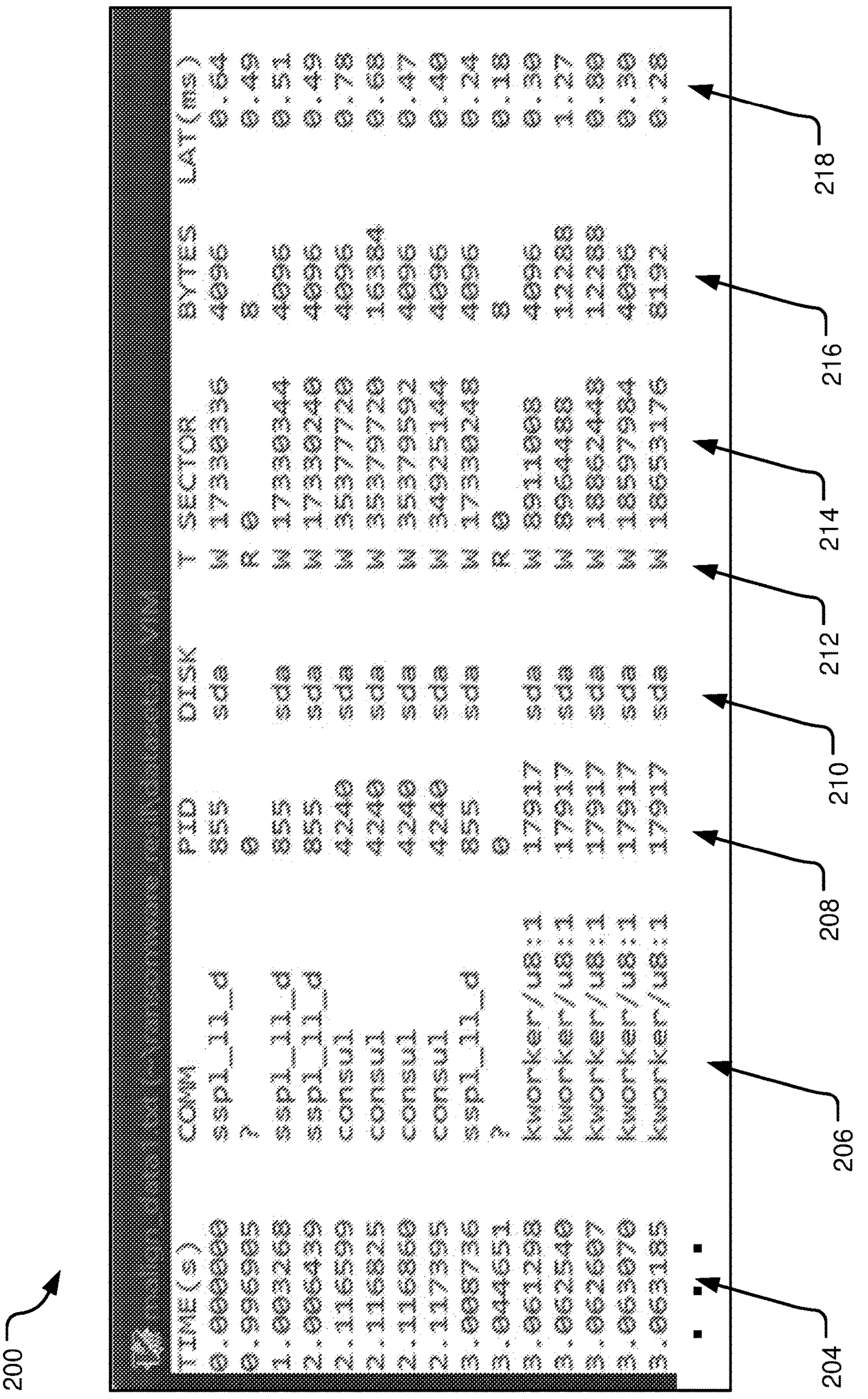
FIG. 2 illustrates example schematic of a series of IO requests received at an object store.

FIG. 2 illustrates schematic of a series of processes 200 running on a server node where the object store is configured. Some of the processes may represent IO requests received at an object store. The processes 200 are different than client requests received at servers or databases that store data as files in that the processes 200 include information including process names, process IDs, that may be used by ransomware to attack object stores. Therefore, the implementations disclosed herein uses various fields of the processes 200 to train a classification model that can be used to detect ransomware or malware attacks on object stores.

Each of the columns of the processes 200 may represent various fields of an IO requests to the object store. For example, the time field 204 is the time stamp that represents the time when the IO request is received at the object store. The comm field 206 is the name of the process running on a server that requests the storage device to do the operation representing the row. The PID field 208 may represent the process ID of the particular process represented by the given row. The disk field 210 represents that disk ID that identifies the type of object store device. The type (T) field 212 represents the type of operation, that is whether the operation of the given row is a read (R) or a write (W) operation.

Similarly, the sector field 214 represents a sector field that designates the sector on the storage device the request is directed to. The bytes field 216 represents the size of data in number of bytes to be accessed by the access request, whereas the last column represents the latency field 218 that gives the time it takes to complete the operation represented by a given row or IO request.

Figure 3:
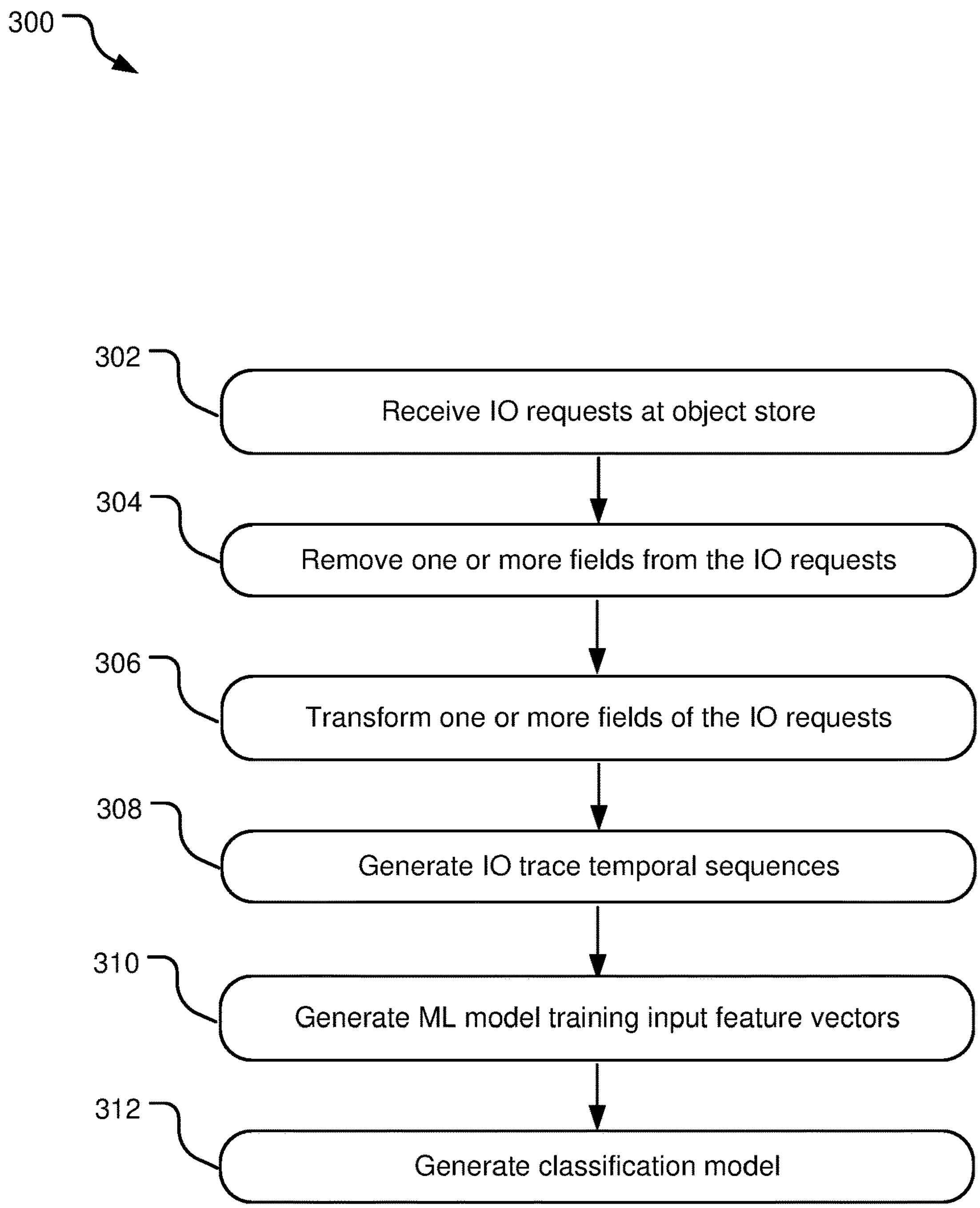
FIG. 3 illustrates example operations for training a machine learning (ML) model to detect ransomware attacks on an object store.

FIG. 3 illustrates example operations 300 for training a machine learning (ML) model to detect ransomware attacks on an object store. Specifically, the operations 300 are operations during a training phase of an ML model. An operation 302 receives IO requests at an object store. Specifically, the IO requests may include a collection of known malware or ransomware attack commands. An operation 304 removes one or more fields from the IO requests. The fields to be removed are determined to be fields that are not important in identifying an IO request at being a malware or ransomware. For example, the time field, which specifies what time the IO request is received at the object store may be such a field that is removed.

An operation 306 transforms one or more fields of the IO request. For example, a scaling may be applied to the value of a sector field of the IO request so that each value falls within the range of −1 to +1. Similarly, the value of a bytes field also may be transformed to fall within a similar range. Subsequently, an operation 308 generates IO trace temporal sequences from the condensed IO requests. For example, in one implementation, 64 or 128 condensed IO requests may be combined to generate an IO trace temporal sequence. In one implementation, the operation 308 for generating IO temporal trace sequence may include generating a flat file form of the IO trace temporal sequence. An operation 310 generates ML model training input feature vectors using the IO trace temporal sequences. Specifically, the ML model input feature vector may include a number of IO trace temporal sequence and ground truth of 0 or 1 for each IO trace temporal sequence, with 1 indicating the IO trace temporal sequence being a ransomware sequence and 0 indicating the IO trace temporal sequence not being a ransomware sequence.

An operation 312 generates a classification model that can be used to classify real time IO requests to the object store as containing malware or ransomware attack commands. The classification model maybe generated using ML using one or more binary classification model. For example, in one implementation, the ML model may be one of a multilayer perceptron classifier (MLPC) model, a logistic regression model, a decision trees model, and a K-Nearest Neighbor model. Generating the ML model input feature vector in the manner recited herein allows achieving over ninety-two percent (92%) overall combined accuracy for the above models.

Figure 4:
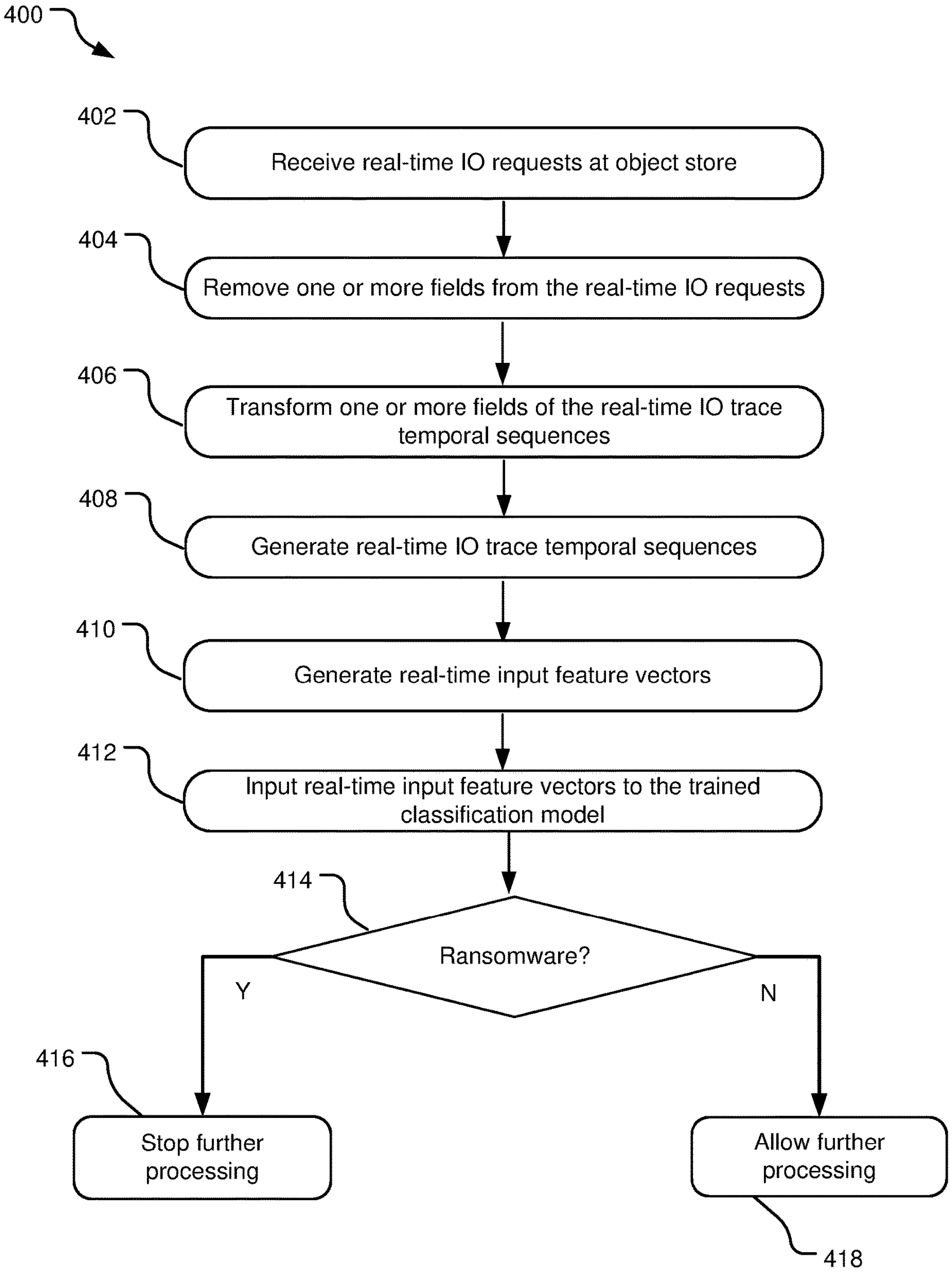
FIG. 4 illustrates example operations for detecting ransomware attacks on an object store using the trained ML model.

FIG. 4 illustrates example operations 400 for detecting ransomware attacks on an object store using the trained ML model. Specifically, the operations 300 are operations during an application phase where real-time IO requests to an object store are processed and classified using the trained ML model to determine if the real-time requests include malware or ransomware attack commands.

An operation 402 receives real-time IO requests at an object store. Examples of a number of such IO requests are disclosed in FIG. 2. An operation 404 removes one or more fields from the real-time IO requests. For example, the operation 404 may remove the time field providing the time when the IO request is received. An operation 406 transforms one or more fields of the real-time IO trace temporal sequences. For example, a sector field may be transformed to that its value lies within a range of −1 to +1. Subsequently, an operation 408 generates real-time IO trace temporal sequences. An operation 410 generates real-time input feature vectors based on the real-time IO trace temporal sequences. An operation 412 inputs the real-time input feature vectors to the trained classification model.

An operation 414 determines if the classification model has classified the processed sequence of IO requests as containing malware or ransomware commands. If the sequence of IO requests is determined to be containing malware or ransomware commands, an operation 416 communicates a request to stop further processing the sequence of IO requests. If it is determined that the sequence of IO requests do not include any malware or ransomware commands, an operation 418 allows further processing of the sequence of IO requests.

Figure 5:
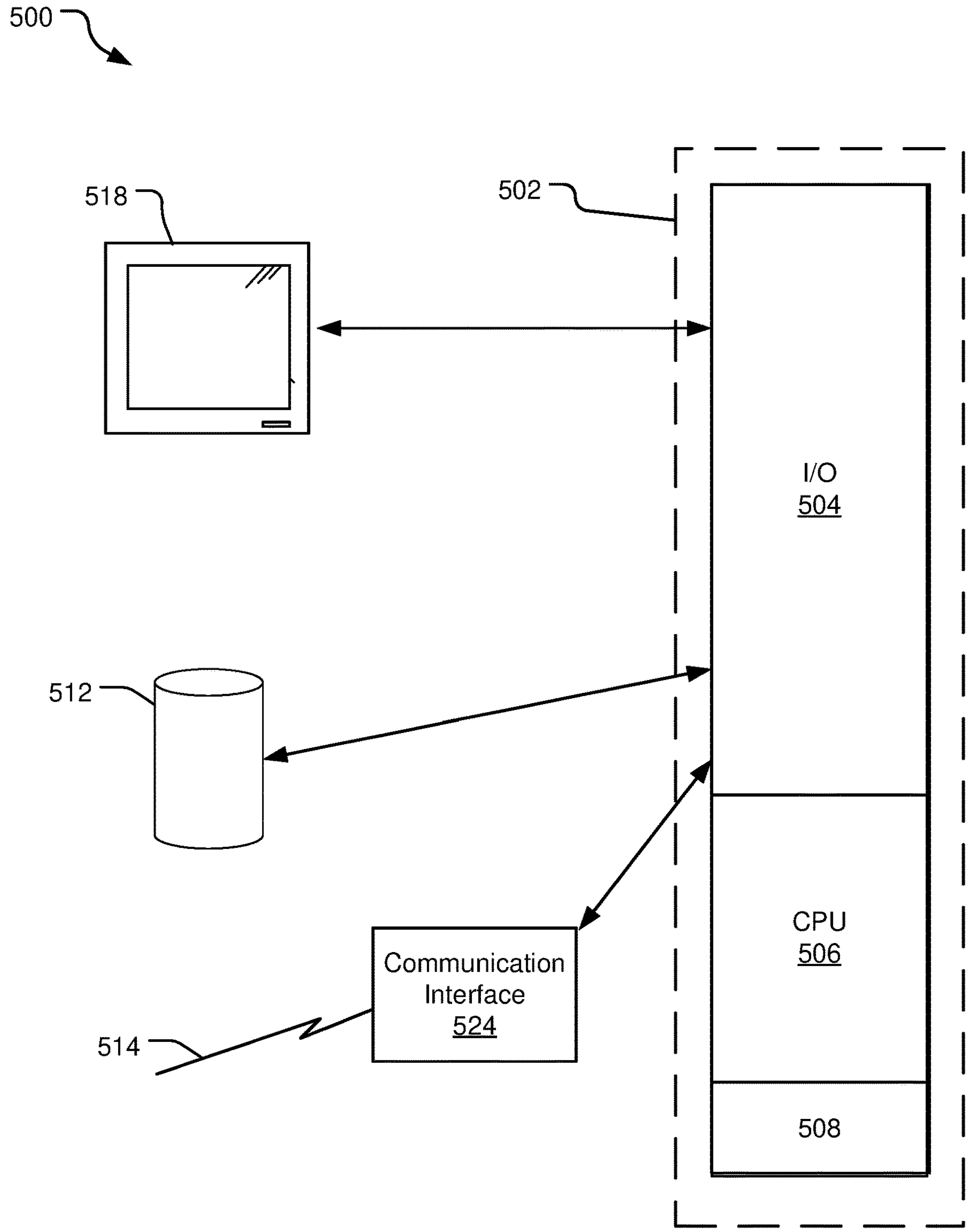
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs or GPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared, and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method, comprising:

receiving a plurality of input/output (IO) requests at an object store;

removing one or more fields from each of the plurality of input/output (IO) requests to generate a plurality of condensed IO requests;

transforming one or more fields of each of the plurality of condensed IO requests to generate transformed IO requests, wherein transforming the one or more fields comprises transforming one or more numeric fields to a non-numeric field;

combining a predetermined number of transformed IO requests to generate IO trace temporal sequences;

generating machine learning (ML) model input feature vectors by assigning each of the IO trace temporal sequences a ground truth value indicating whether the IO trace temporal sequence represents a ransomware attack; and training an ML model using a plurality of the ML model input feature vectors.

2. The method of claim 1, wherein combining a predetermined number of transformed IO requests further comprises generating a flat file using raw data from the predetermined number of transformed IO requests.

3. The method of claim 1, wherein transforming one or more fields of each of the plurality of condensed IO requests further comprises transforming one or more fields of each of the plurality of IO requests using one-hot coding.

4. The method of claim 3, wherein transforming one or more fields of each of the plurality of IO requests using one-hot coding comprises transforming a sector field to a numeric field with values between −1 to +1.

5. The method of claim 3, wherein transforming one or more fields of each of the plurality of IO trace requests using one-hot coding comprises transforming a byte size field to a numeric field represented by +1 or −1.

6. The method of claim 1, wherein the plurality of input/output (IO) requests includes a number of known ransomware attack IO requests.

7. The method of claim 1, wherein combining a predetermined number of transformed IO requests comprises combining 256 transformed IO requests.

8. In a computing environment, a method performed at least in part on at least one processor, the method comprising:

receiving a plurality of input/output (IO) requests at an object store;

removing one or more fields from each of the plurality of input/output (IO) requests to generate a plurality of condensed IO requests;

transforming one or more fields of each of the plurality of condensed IO requests to generate transformed IO requests, wherein transforming the one or more fields comprises transforming one or more numeric fields to a non-numeric field;

combining a predetermined number of transformed IO requests to generate IO trace temporal sequences;

generating machine learning (ML) model input feature vectors by assigning each of the IO trace temporal sequences a ground truth value indicating whether the IO trace temporal sequence represents a ransomware attack, wherein the predetermined number of transformed IO requests depends on a speed required to the detect ransomware attack; and training an ML model using a plurality of the ML model input feature vectors.

9. The method of claim 8, wherein combining a predetermined number of transformed IO requests further comprises generating a flat file using raw data from the predetermined number of transformed IO requests.

10. The method of claim 8, wherein transforming one or more fields of each of the plurality of condensed IO requests further comprises transforming one or more fields of each of the plurality of IO requests using one-hot coding.

11. The method of claim 10, wherein transforming one or more fields of each of the plurality of IO requests using one-hot coding comprises transforming a sector field to a numeric field with values between −1 to +1.

12. The method of claim 10, wherein transforming one or more fields of each of the plurality of IO trace requests using one-hot coding comprises transforming a byte size field to a numeric field represented by +1 or −1.

13. The method of claim 10, wherein the plurality of input/output (IO) requests includes a number of known ransomware attack IO requests.

14. The method of claim 8, wherein combining a predetermined number of transformed IO requests comprises combining 256 transformed IO requests.

15. One or more tangible computer-readable storage media encoding computer-executable instructions for executing on a computer system a computer process, the computer process comprising:

receiving a plurality of input/output (IO) requests at an object store;

removing one or more fields from each of the plurality of input/output (IO) requests to generate a plurality of condensed IO requests;

transforming one or more fields of each of the plurality of condensed IO requests to generate transformed IO requests wherein transforming the one or more fields comprises transforming one or more numeric fields to a non-numeric field;

combining a predetermined number of transformed IO requests to generate IO trace temporal sequences;

generating machine learning (ML) model input feature vectors by assigning each of the IO trace temporal sequences a ground truth value indicating whether the IO trace temporal sequence represents a ransomware attack; and training an ML model using a plurality of the ML model input feature vectors.

16. One or more tangible computer-readable storage media of claim 15, wherein combining a predetermined number of transformed IO requests further comprises generating a flat file using raw data from the predetermined number of transformed IO requests.

17. One or more tangible computer-readable storage media of claim 15, wherein transforming one or more fields of each of the plurality of condensed IO requests further comprises transforming one or more fields of each of the plurality of IO requests using one-hot coding.

18. One or more tangible computer-readable storage media of claim 17, wherein transforming one or more fields of each of the plurality of IO requests using one-hot coding comprises transforming a sector field to a numeric field with values between −1 to +1.

19. One or more tangible computer-readable storage media of claim 17, wherein transforming one or more fields of each of the plurality of IO trace requests using one-hot coding comprises transforming a byte size field to a numeric field represented by +1 or −1.

20. One or more tangible computer-readable storage media of claim 15, wherein combining a predetermined number of transformed IO requests comprises combining 256 transformed IO requests.

* * * * *